(12) United States Patent
Henning et al.

(10) Patent No.: US 8,575,058 B2
(45) Date of Patent: Nov. 5, 2013

(54) ACTIVATED CARBON CATALYST

(75) Inventors: Klaus-Dirk Henning, Essen (DE); Wolfgang Bongartz, Moenchengladbach (DE)

(73) Assignee: CarboTech AC GmbH, Essen (DE)

( * ) Notice: Subject to any disclaimer, the term of this patent is extended or adjusted under 35 U.S.C. 154(b) by 159 days.

(21) Appl. No.: 12/413,658

(22) Filed: Mar. 30, 2009

(65) Prior Publication Data

US 2009/0246110 A1    Oct. 1, 2009

(30) Foreign Application Priority Data

Mar. 31, 2008 (DE) .......................... 10 2008 000 890

(51) Int. Cl.
| | | |
|---|---|---|
| *B01D 53/56* | (2006.01) | |
| *C01B 31/00* | (2006.01) | |
| *C01B 31/08* | (2006.01) | |
| *C09C 1/56* | (2006.01) | |
| *B01J 21/18* | (2006.01) | |
| *B01J 21/00* | (2006.01) | |
| *B01J 29/04* | (2006.01) | |
| *B01J 23/00* | (2006.01) | |
| *B01J 27/24* | (2006.01) | |
| *B32B 3/00* | (2006.01) | |

(52) U.S. Cl.
USPC ............. 502/180; 502/263; 502/87; 502/355; 502/200; 502/431; 423/239.1; 423/445 R; 423/460; 428/312.2

(58) Field of Classification Search
None
See application file for complete search history.

(56) References Cited

PUBLICATIONS

Bashkova et al.; Adsorption/Oxidation of Ch3SH on Activated Carbons Containing Nitrogen; Langmuir; 19, pp. 6115-6121; 2003.*

* cited by examiner

*Primary Examiner* — Guinever Gregorio
(74) *Attorney, Agent, or Firm* — Rankin, Hill & Clark LLP

(57) ABSTRACT

An activated carbon catalyst is described which is sufficiently active in the presence of catalytic poisons in crude gas to convert nitrogen oxides to nitrogen in the presence of ammonia.

2 Claims, No Drawings

ACTIVATED CARBON CATALYST

The present invention concerns an activated carbon catalyst which, even in the presence of catalyst poisons, is sufficiently active in order to convert nitrogen oxides to nitrogen and water in the presence of ammonia. A further object of the present invention is a process for the production of the activated carbon catalyst according to the present invention as well as its use for the reduction of nitrogen oxides.

Nitrogen oxides belong to the exhaust components which result during combustion processes and their allowed emissions have to be continuously reduced because of environmental influences. The reduction of nitrogen oxides occurs mostly with the assistance of catalysts.

Processes for the reduction of nitrogen oxides are known per se. These processes became known under the general term "SCR processes", whereby SCR stands for "selective catalytic reduction". These processes have been used for many years in power stations, furnaces, refuse incinerators, gas turbines, industrial plants and motors. A detailed description of such processes can be found in DE 34 28 232 A1. Characteristic for such SCR processes is that the chemical reaction at the mineral-doped carbon-free catalyst develops in general selectively, i.e. the nitrogen oxides NO and $NO_2$ are preferably reduced, whereas unwanted secondary reactions respectively side-reactions (such as for example the oxidation of sulphur dioxide to sulphur trioxide) are eliminated to a large extent.

Mixed oxides containing $V_2O_5$, (for example in the form of $V_2O_5/WO_3TiO_2$) can be used as SCR catalysts. Zeolites are further known catalytic converters.

In practical application ammonia or compounds which separate ammonia during their application such as urea or ammonium formate in a solid or dissolved form are used as reduction agents. According to the following reaction equation (1) one mol ammonia is required for the conversion of one mol nitrogen monoxide:

$$4NO+4NH_3+O_2 \rightarrow 4N_2+6H_2O \qquad (1).$$

The products of the conversion are correspondingly water ($H_2O$) and nitrogen ($N_2$). Seen chemically, the conversion concerns a comproportionation of the nitrogen oxides with ammonia to nitrogen.

The catalysts for the SCR process known from the state of the art have the disadvantage that, in the presence of catalyst poisons in the crude gas (e.g. arsenic, boron), they very quickly lose their catalytic activity. In addition they are not able to convert nitrogen oxides to nitrogen and water in the presence of ammonia in an acceptable temperature range of, for example, 90 to 160° C.

The classical SCR processes with the commercially known SCR catalysts are not suitable for this problem, because the said heavy metals already deactivate the catalyst after short duration times. In addition, the required conversion temperatures of the classical SCR catalysts are from 300 to 350° C. and even for the expensive new low temperature SCR catalysts, such as described for example in EP 0 593 790 A, temperatures of more than 160° C. are required. Thus, there is an energetic disadvantage with the required calefaction of the gases at temperatures of more than 160° C.

Starting with this state of the art, the present invention sets the problem of providing a catalyst which, in the presence of catalytic poisons, is sufficiently active to be able to reduce nitrogen oxides in the presence of ammonia. In doing so the conversion should preferably be carried out at a temperature range of less than 180° C., more preferably in a range of from 90 to 160° C., According to the invention this problem is solved by an activated carbon catalyst which has a specific nitrogen content in combination with specific pore volumes for micropores<1 nm and macropores>1 nm.

The activated carbon catalyst in accordance with the invention is characterized in that it has (a) a nitrogen content of the carbon frame of more than 0.4 wt.-%;
(b) a pore volume of the micropores<1 nm. of less than 0.47 $cm^3/g$; and
(c) a pore volume of the macropores>1 nm of less than 0.72 $cm^3/g$.

The first embodiment of the present invention comprises activated carbon catalysts which have a nitrogen content of the carbon frame of 0.4 to 0.5 wt.-%.

A second embodiment of the present invention comprises activated carbon catalysts which have a nitrogen content of the carbon frame of 0.8 to 1.6 wt.-%.

A third embodiment of the present invention comprises activated carbon catalysts which have a pore volume of the micropores<1 nm of less than 0.2 $cm^3/g$.

A fourth embodiment of the present invention comprises activated carbon catalysts which have a pore volume of the micropores<1 nm of 0.2 to 0.4 $cm^3/g$.

A fifth embodiment of the present invention comprises activated carbon catalysts which have a pore volume of the macropores>1 nm of less than 0.5 $cm^3/g$.

A sixth embodiment of the present invention comprises activated carbon catalysts which have a pore volume of the macropores>1 nm of 0.4 to 0.6 $cm^3/g$.

A seventh, particularly preferred embodiment is an activated carbon catalyst, characterized in that it comprises a nitrogen content of the carbon frame of less than 0.5 wt.-% and a pore volume of the micropores<1 nm of less than 0.2 $cm^3/g$ and a pore volume of the macropores>1 nm of less than 0.4 $cm^3/g$.

An eighth, particularly preferred embodiment is an activated carbon catalyst, characterized in that it comprises a nitrogen content of the carbon frame of more than 0.4 wt.-%, preferably between 0.8 and 1.5 wt.-%, a pore volume of the micropores<1 nm of between 0.2 and 0.4 $cm^3/g$ and a pore volume of the macropores>1 nm of between 0.4 and 0.6 $cm^3/g$.

According to the invention it has been established that an activated carbon catalyst which complies with the preceding requirements is suitable, even in the presence of the catalyst poisons, for converting nitrogen oxides to nitrogen and water in the presence of ammonia or compounds which separate ammonia during their application, such as hexamethylenetetramine, urea or ammonium formate, in a temperature range of preferably below 160° C., in particular in a temperature range of 90 to 160° C. If ammonia is used, this can be in the form of gaseous ammonia or in the form of ammoniacal gas liquor (ammonia water) with varying concentrations of ammonia.

The examples show that with the specific integration of nitrogen atoms in the grid frame (framework) of the activated carbon catalyst according to the invention, the catalytic activity regarding the $NO_x$ reduction in the presence of ammonia or compounds which separate ammonia during their application is specifically increased. It is further shown that not only the nitrogen content, but also the pore volume (measured by benzene adsorption and mercury porosimetry) influences the catalytic activity of the activated carbon catalyst according to the invention.

By means of a specific variation of these two parameters, it is possible to produce activated carbon catalysts with varying high catalytic activities and production costs adjustable to the particular application.

Further examples support that also in the presence of heavy metals, such as arsenic and boron, the catalytic activity concerning the $NO_x$ reduction is largely preserved. Only very large chargings of the activated carbon catalyst according to the invention lead to slow deactivation. This means that, for the use of the activated carbon catalyst according to the invention for the cleansing of gases which contain nitrogen oxides ($NO_x$) and heavy metals, nitrogen oxides as well as poisonous heavy metals are removed from the crude gas.

The activated carbon catalyst according to the invention can be used as a full catalyst as well as also a catalyst provided on a carrier. If the catalyst according to the invention is developed as a catalyst provided on a carrier, this can be achieved by milling the catalyst according to the invention and applying it to any carrier material.

A further object of the present invention is the production of the activated carbon catalyst according to the invention.

Generally, the production of the activated carbon catalyst according to the invention is carried out in such a manner that a carbonaceous material is brought into contact with compounds containing nitrogen.

A carbonaceous material is chosen from all those known materials which are suitable for the production of activated carbon, such as coconut shells, coal, lignite coke, turf coke and polymers.

Primarily, urea is used as a nitrogenous material. It is also possible to use ammonia (gaseous or in aqueous solutions in varying concentrations), hexamethylenetetramine, polyacrlynitrile or melamine.

The catalyst according to the present invention is preferably prepared by using a multistage fluidized bed.

In a preferred embodiment an aqueous urea solution as a nitrogen compound is added to the multistage fluidized bed. The concentration of the urea solution is 45%. It is used in an amount of 2 to 10 kg urea based on 100 kg carbonaceous material. An amount of urea of 5 to 6 kg based on 100 kg carbonaceous material has proved to be ideal.

It is advantageous and economic if the carbonaceous material is partially gasified with a mixture of steam, nitrogen and carbon dioxide in a fluidized bed pit furnace (shaft furnace), rotary furnace or multilevel furnace at temperatures of more than 750° C., preferably between 800 and 900° C., and the substance containing nitrogen is simultaneously fed into the reactor. The gasification gas of steam, nitrogen and carbon dioxide can also be obtained by combusting natural gas, oil or other combustibles containing hydrocarbons. By means of this partial gasification nitrogen is incorporated into the carbon frame (framework) and the desired micro- and macropore system is also achieved. The micro- and macropore volumes increase with the increasing partial gasification of the carbon frame (framework) so that by varying the duration of the partial gasification the catalysts according to the invention are obtained. The micro- as well as the macropores increase with increased partial gasification, however, the production costs also increase.

A further object of the present invention is the use of at least one activated carbon catalyst according to the invention for the reduction of nitrogen oxides.

The conversion of the nitrogen oxides is preferably carried out in the presence of ammonia (in a gaseous form or in the form of aqueous solutions with any ammonia concentrations) or compounds which separate ammonia, such as for example urea or ammonium formate, at a temperature range of preferably below 180° C., in particular at a temperature range of from 90 to 160° C.

A particular embodiment of the use according to the invention is that the thus treated crude gas can contain catalytic poisons such as arsenic and boron.

A further object of the present invention is the use of the active carbon catalyst according to the present invention in the sulfacid process. In this process, sulphur dioxide is reacted with water and oxygen on moist active active carbon. Technical application of this process was carried out under the name "sulfacid process" (Sulfur No. 117, March/April 1975, 32-38).

The activated carbon catalyst may be used in these processes in any arbitrary form. Possibilities are, for example, pellets, granules, powder or in combination with a carrier material.

With respect to the use of the active carbon catalyst according to the present invention in the reduction of nitrogen oxides, it is also possible within the present invention to use the activated carbon catalyst according to the invention together with combinations of a conventional SCR catalyst, which is either used before or after the carbon catalyst according to the present invention. There is, of course, also the possibility of combining more than two catalysts according to the invention to the catalyst alignment.

The present invention is described in more detail on the basis of the following examples which, however, do not restrict the invention.

Production of the Activated Carbon Catalyst

In order to improve the fundamental idea samples with different nitrogen contents and different micro- and macropore volumes were first of all produced. Thus, 600 kg of 4 mm shape products of coal briquettes were fed per hour to an eight-stage fluidized bed reactor. The furnace temperature was approx. 900° C. and the fluidizing gas is produced by burning natural gas. 300 g steam per hour was fed for the partial gasification of the 4 mm shape products of briquettes. The samples No. 1 and No. 2 (comparative example) were produced without the addition of a nitrogen compound. The other samples of the activated carbon catalysts were produced with the addition of the nitrogenous compound urea (in the form of a 45% aqueous solution), whereby the aqueous solution is fed into the fluidized bed reactor.

For the deposition of nitrogen in the carbon frame of up to a content of approx. 0.4 wt.-% nitrogen 2 kg urea/100 kg, for 0.8 wt.-% nitrogen 3.8 kg urea/100 kg and for 1.5 wt.-% nitrogen 6 kg urea/100 kg activated carbon catalyst was necessary. With the increase of the pore volume of the samples longer duration times in the fluidized bed reactor were necessary.

Determination of the NO Conversion

The NO conversion was measured with a test apparatus for the evaluation of the comparative samples and the catalysts produced according to the invention. The NO conversion is determined with a model flue gas (400 ppm NO, 400 ppm $NH_3$, 22 vol.-% $O_2$ and 17 vol.% $H_2O$, moiety: $N_2$) at a temperature of 120° C.

1.06 l of the dried activated carbon is fed into a heated reactor and processed with the model flue gas at a reaction temperature of 120° C. The contact time is 10 sec. The NO break through concentration is registered during measuring and the NO conversion (based on the initial NO concentration) is calculated starting from the NO concentration in the pure gas after 20 hours.

EXAMPLE 1

Comparative Example

The samples No. 1 and No. 2 were produced without the addition of the nitrogenous substance urea. The NO conversion was very low with 42% (Sample 1) and 44% (Sample 2). -Although the micro- and macropore volumes of Sample 2 were clearly higher than Sample 1, only a minor—within the scope of the measurement accuracy—increase in the NO conversion was measured.

EXAMPLE 2

The Samples No. 1-0.4% nitrogen and 1-0.8% nitrogen were obtained by feeding an urea solution to the fluidized bed reactor. A NO conversion of 65% was measured for a nitrogen content of 0.4 wt.-% and 71% was measured for a nitrogen content of 0.8 wt.-%.

EXAMPLE 3

According to the invention the nitrogen content of the samples 2-0.4% N, 2-0.8% N and 2-1.5% N was increased to 0.4, 0.8 and 1.5 wt.-% by feeding various amounts of urea to the fluidized bed reactor The increased nitrogen content in the carbon frame improved the NO conversion to 67%, 80% and 91% (1.5 wt.-% N).

EXAMPLE 4

Example 4 should clarify that a further increase of the micro- and macropore volumes with identical nitrogen contents does not lead to an improvement of the NO conversion. On the contrary, as the samples 4-0.4% N, 4-0.8% N, 5-04% N and 5-0.8% N prove, the CO conversion is reduced as from a micropore volume<1 nm of 0.34 cm$^3$/g and a macropore volume>1 nm of 0.45 cm$^3$/g.

The Examples 1 to 4 make clear that not only the nitrogen content of the activated carbon catalyst influences the NO conversion, but also the pore volume. As the production costs of the activated carbon catalyst increase with the increase in nitrogen content, but particularly with increasing the micro- and macropore volumes, the following improvement is carried out for economic reasons.

For uncomplicated gas purification problems with a low NO content, catalyst type 1-0.4% N and 1-0.8% N (activated carbon catalysts according to the invention) are suitable. From an economic and technical point of view, the catalysts 2-0.4% N, 2-0.8% N, 2-1.5% N as well as the types 3-0.4% N, 2-0.8% N are to be considered as being optimized products for high NO contents (>300 ppm) in crude gas.

Influence of Heavy Metals on the Catalytic Activity

As it is difficult to produce a NO and heavy metal containing model gas in a laboratory, the following method was chosen: The catalytic sample 2-0.8% N was used in a pilot facility for the removal of NO from real exhaust, which, in addition to NO$_x$, also contained the heavy metals arsenic and boron. After a residence time of 12 sec the NO content of 360 ppm could be reduced to 50 ppm. In order to obtain samples which were varyingly contaminated with arsenic and boron for activity experiments in the NO test apparatus, they were taken from the initial gas level of the reactor after 3 days (Sample 6.1.2-0.8% N) and 9 days (Sample 6.2.2-0.8% N). Although both samples had collected considerable quantities of arsenic and boron, the catalytic activity was only marginally reduced from 80% (initial material) to 73% or 71% respectively. Only after extremely high heavy metal contents (Sample 6.3.2.-0.8% N) of 865 mg/kg arsenic and 7185 mg/kg boron, did the catalytic activity sink to 15%. As the heavy metals in the initial gas layer of the pilot facility are precipitated, only 50 ppm NO was contained in the pure gas after 45 days.

TABLE 1

Trials with the claimed catalyst

| Sample No. | Pore volume (cm$^3$/g) micropores <1 nm | Pore volume (cm$^3$/g) macropores >1 nm | Nitrogen content (% N) | Heavy metal in the catalyst arsenic m/kg | Heavy metal in the catalyst boron mg/kg | NO conversion (%) |
|---|---|---|---|---|---|---|
|  | 0.15 | 0.36 | 0.3 | — | — | 42 |
| 1-0.4% N | " | " | 0.4 | — | — | 65 |
| 1-0.8% N | " | " | 0.8 | — | — | 71 |
| 2-0.4% N | 0.26 | 0.41 | 0.4 | — | — | 67 |
| 2-0.8% N | " | " | 0.8 | — | — | 80 |
| 2-1.5% N | " | " | 1.5 | — | — | 91 |
| 3-0.4% N | 0.34 | 0.45 | 0.4 | — | — | 63 |
| 3-0.8% N | " | " | " | — | — | 78 |
| 4-0.4% N | 0.4 | 0.60 | 0.4 | — | — | 59 |
| 4-0.8% N | " | " | 0.8 | — | — | 71 |
| 5-0.4% N | 0.47 | 0.72 | 0.4 | — | — | 49 |
| 5-0.8% N | " | " | " | — | — | 64 |
| 6.1.2-0.8% N* | 0.2 | 0.41 | 0.8 | 31 | 2560 | 72 |
| 6.2.2-0.8% N* |  |  |  | 115 | 1340 | 71 |
| 6.3.2-0.8% N* |  |  |  | 865 | 7185 | 15 |

*Catalyst 2-0.8% N was charged with real exhaust (contaminated with NO$_x$, arsenic and boron), in a pilot facility and removed at the gas access side after various catalytic durations and examined in the NO test facility for the evaluation of the NO$_x$ conversion.

The invention claimed is:

1. An activated carbon catalyst, comprising a carbonaceous material and at least one compound containing nitrogen, the catalyst having a nitrogen content of the carbon framework of more than 0.4 wt.-% and less than 0.5 wt.-% and a pore volume of the micropores <1 nm of less than 0.2 cm$^3$/g and a pore volume of the macropores >1 nm of less than 0.4 cm$^3$/g.

2. An activated carbon catalyst, comprising a carbonaceous material and at least one compound containing nitrogen, the catalyst having a nitrogen content of between 0.8 and 1.5 wt.-%, a pore volume of the micropores <1 nm between 0.2 and 0.4 cm$^3$/g and a pore volume of the macropores >1 nm between 0.4 and 0.6 cm$^3$/g.

* * * * *